United States Patent
Alvey et al.

(10) Patent No.: US 10,176,205 B2
(45) Date of Patent: *Jan. 8, 2019

(54) USING PARALLEL INSERT SUB-RANGES TO INSERT INTO A COLUMN STORE

(71) Applicant: INTERNATIONAL BUSINESS MACHINES CORPORATION, Armonk, NY (US)

(72) Inventors: Walter D. Alvey, San Jose, CA (US); Chandrasekaran Mohan, San Jose, CA (US); Steven R. Pearson, Portland, OR (US); James J. Seeger, Jr., Portland, OR (US); Richard S. Sidle, Mountain View, CA (US); Adam J. Storm, Toronto (CA); Roger L. Q. Zheng, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 192 days.

This patent is subject to a terminal disclaimer.

(21) Appl. No.: 15/227,383

(22) Filed: Aug. 3, 2016

(65) Prior Publication Data
US 2016/0342635 A1   Nov. 24, 2016

Related U.S. Application Data

(63) Continuation of application No. 14/542,248, filed on Nov. 14, 2014, now Pat. No. 9,442,914, which is a (Continued)

(51) Int. Cl.
*G06F 17/24* (2006.01)
*G06F 17/30* (2006.01)

(52) U.S. Cl.
CPC ...... *G06F 17/30315* (2013.01); *G06F 17/245* (2013.01); *G06F 17/303* (2013.01);
(Continued)

(58) Field of Classification Search
CPC ......... G06F 17/30315; G06F 17/30377; G06F 17/30374; G06F 17/30339; G06F 17/303; G06F 17/245
See application file for complete search history.

(56) References Cited

U.S. PATENT DOCUMENTS 7,103,588 B2   9/2006   Beck et al.
7,966,343 B2   6/2011   Yang et al.
(Continued)

OTHER PUBLICATIONS

IBM Corporation, "Concurrent Transactions and Multi-Threaded Database Access in Embedded SQL Applications", [online], [Retrieved on Jan. 12, 2014], retrieved from the Internet at <URL: http://publib.boulder.ibm.com/infocenter/db2luw/v10r1/topic/com.ibm.db2.luw.apdv.embed.doc/doc/c0006107.html>, 4 pp. IBM Corporation, "Multithreaded CLI Applications", [online], [retrieved on Jan. 12, 2014], retrieved from the Internet at <URL: http://publib.boulder.ibm.com/infocenter/db2luw/v10r1/topic/com.ibm.db2.luw.apdv.cli.doc/doc/c0007846.html>, 2 pp.
(Continued)

*Primary Examiner* — Jorge A Casanova
(74) *Attorney, Agent, or Firm* — Janaki K. Davda; Konrad, Raynes, Davda & Victor LLP (57) ABSTRACT

Provided are techniques for using parallel inserts to insert into a column store. A list of sub-ranges for a columnar table is created. A change statement for one or more rows to be inserted into the columnar table is received. For each of the received change statements, a sub-range from the list of sub-ranges is identified and data is serially inserted into the identified sub-range of the columnar table, while allowing parallel processing of each change statement for different sub-ranges of the columnar table.

18 Claims, 7 Drawing Sheets

Related U.S. Application Data continuation of application No. 14/168,934, filed on Jan. 30, 2014, now Pat. No. 9,442,913.

(52) U.S. Cl.
CPC .. *G06F 17/30339* (2013.01); *G06F 17/30374* (2013.01); *G06F 17/30377* (2013.01)

(56) References Cited

U.S. PATENT DOCUMENTS

| | | | |
|---|---|---|---|
| 8,335,782 | B2 | 12/2012 | Nishizawa et al. |
| 9,058,357 | B1 | 6/2015 | Birnbaum et al. |
| 2004/0225673 | A1 | 11/2004 | Beck et al. |
| 2005/0102326 | A1 | 5/2005 | Peleg et al. |
| 2009/0150336 | A1 | 6/2009 | Basu et al. |
| 2010/0235335 | A1 | 9/2010 | Heman et al. |
| 2010/0281005 | A1 | 11/2010 | Carlin et al. |
| 2011/0010330 | A1 | 1/2011 | McCline et al. |
| 2011/0131192 | A1 | 6/2011 | Finnie et al. |
| 2012/0078904 | A1 | 3/2012 | Agrawal et al. |
| 2012/0221528 | A1 | 8/2012 | Renkes et al. |
| 2012/0323971 | A1 | 12/2012 | Pasupuleti |
| 2013/0151502 | A1 | 6/2013 | Yoon et al. |
| 2013/0166554 | A1 | 6/2013 | Yoon et al. |

OTHER PUBLICATIONS

Idreos, S., et al., "Self-Organizing Tuple Reconstruction in Column-Stores", Proceedings of the 2009 ACM SIGMOD International Conference on Management of Data, 2009, 12 pp.

Johnson, R., et al., "Row-Wise Parallel Predicate Evaluation", Proceedings of the VLDB Endowment, vol. 1, Issue 1, Aug. 2008, 13 pp.

Mell, P., et al., "Effectively and Securely Using the Cloud Computing Paradigm", NIST, Information Technology Laboratory, Oct. 7, 2009, 80 pp.

Mell, P., et al., "The NIST Definition of Cloud Computing (Draft)", Recommendations of the National Institute of Standards and Technology, Special Publication 800-145 (Draft), Jan. 2011, 7 pp.

Preliminary Amendment, Nov. 14, 2014, for U.S. Appl. No. 14/168,934, filed Jan. 30, 2014 by W.D. Alvey et al., Total 5 pp. [57.327 (PrelimAmend)].

U.S. Appl. No. 14/168,934, filed Jan. 30, 2014, entitled "Using Parallel Insert Sub-Ranges to Insert Into a Column Store", invented by W.D. Alvey et al., Total 33 pp.

Preliminary Amendment, dated Nov. 14, 2014, for U.S. Appl. No. 14/542,248, filed Nov. 14, 2014 by W.D. Alvey et al., Total 5 pp.

U.S. Appl. No. 14/542,248, filed Nov. 14, 2014, entitled "Using Parallel Insert Sub-Ranges to Insert Into a Column Store", invented by W.D. Alvey et al., Total 33 pp.

Notice of Allowance, dated Jun. 1, 2016, for U.S. Appl. No. 14/168,934, filed Jan. 30, 2014 by W.D. Alvey et al., Total 24 pp.

Notice of Allowance, dated May 31, 2016, for U.S. Appl. No. 14/542,248, filed Nov. 14, 2014 by W.D. Alvey et al., Total 18 pp.

USING PARALLEL INSERT SUB-RANGES TO INSERT INTO A COLUMN STORE

BACKGROUND

Embodiments of the invention relate to using parallel insert sub-ranges to insert into a column store.

A database may store data in a table that consist of rows (also referred to as tuples or records) and columns (also referred to as fields or attributes) of data. The database may be accessed using Structured Query Language (SQL) interface. The SQL interface has evolved into a standard language for RDBMS software and has been adopted as such by both the American National Standards Institute (ANSI) and the International Standards Organization (ISO).

A table in a database may be accessed using an index. An index is an ordered set of references (e.g., pointers) to the records in the table. The index is used to access each record in the table using a key (i.e., one of the fields or attributes of the record, which corresponds to a column). The term "key" may also be referred to as "index key". Without an index, finding a record requires a scan (e.g., linearly) of an entire table. Indexes provide an alternate technique to accessing data in a table. Users can create indexes on a table after the table is built. An index is based on one or more columns of the table. The data in the table may be stored in pages of physical storage.

A query may be described as a request for information from a database based on specific conditions. A query typically includes one or more predicates. A predicate may be described as an element of a search condition that expresses or implies a comparison operation (e.g., A=3).

The database may be column store oriented or row store oriented. Both have INSERT, UPDATE and DELETE (IUD) functionality. From the viewpoint of an external user or application, complete rows (possibly omitting columns that have defaults) are inserted, regardless of whether the database is row store oriented or column store oriented. Internally, in a row store oriented database the entire row is stored on a page, while, in a column store oriented database, each column value is stored in one of the pages that belongs to that column (while inserting a complete row in a single insert operation).

Tables that are column store oriented may be referred to as "columnar tables". Some conventional systems insert into columnar tables using staging tables. A staging table may be row-based, supporting concurrent insert to the same pages through the usual locking/latching. Some conventional systems disallow updates to new rows. Some conventional systems do not compress data until merge time. Also, with staging tables, insert, update, and delete operations require updating two tables (a staging table and a target table), and queries require reading two tables (the staging table and the target table).

SUMMARY

Provided is a method for using parallel inserts to insert into a column store. A list of sub-ranges is created. A change statement for one or more rows is received. For each of the received change statements, a sub-range from the list of sub-ranges is selected. Data is inserted into the identified sub-range, while allowing parallel processing of each change statement for different sub-ranges.

Provided is a computer system for using parallel inserts to change a columnar table, comprising: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: creating a list of sub-ranges for a columnar table; receiving a change statement for one or more rows to be inserted into the columnar table; and, for each of the received change statements, identifying a sub-range from the list of sub-ranges and serially inserting data into the identified sub-range of the columnar table, while allowing parallel processing of each change statement for different sub-ranges of the columnar table.

Provided is a computer program product using parallel inserts to change a columnar table, the computer program product comprising a computer readable storage medium having program instructions embodied therewith, the program instructions executable by a processor of a computer to cause the processor to: create, by the processor, a list of sub-ranges for a columnar table; receive, by the processor, a change statement for one or more rows to be inserted into the columnar table; and, for each of the received change statements, identify, by the processor, a sub-range from the list of sub-ranges and serially insert, by the processor, data into the identified sub-range of the columnar table, while allowing parallel processing of each change statement for different sub-ranges of the columnar table.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
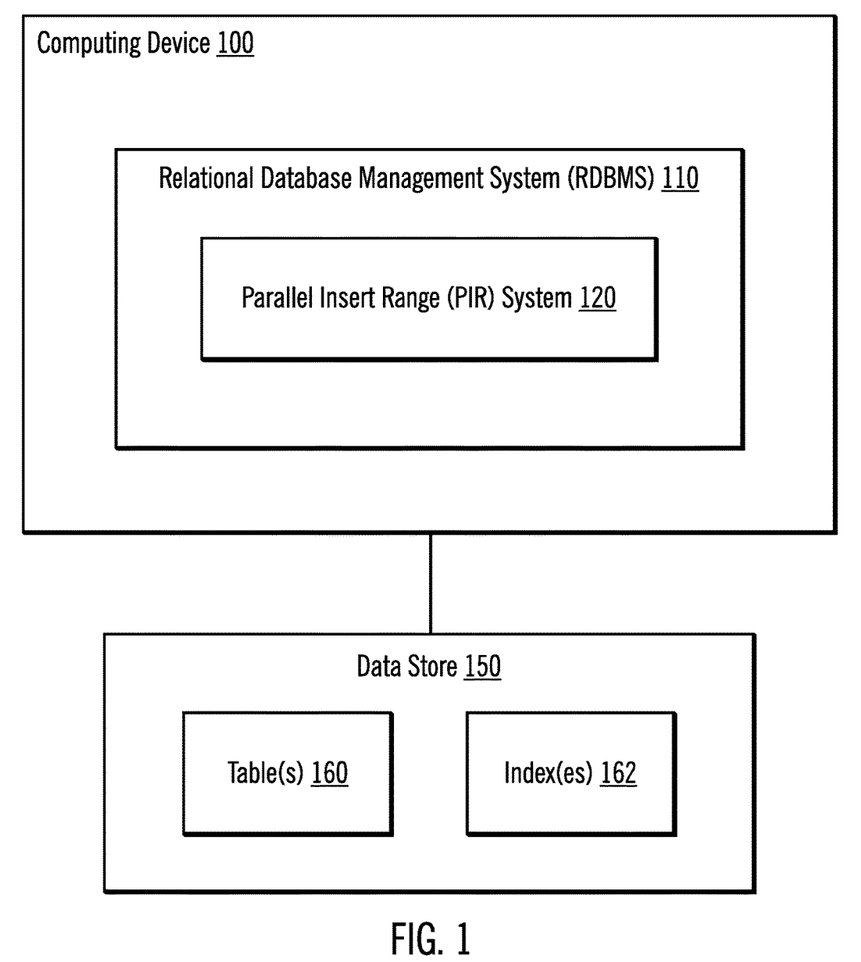
FIG. 1 illustrates, in a block diagram, a computing environment in accordance with certain embodiments.

FIG. 1 illustrates, in a block diagram, a computing environment in accordance with certain embodiments. A computer device 100 (e.g., a server computer) includes a Relational DataBase Management System (RDBMS) 110, and the RDBMS includes a Parallel Insert Range (PIR) system 120. The computing device 100 is coupled to a data store 150. The data store 150 includes one or more tables 160 and one or more indexes 162.

Embodiments are directed to tables that are column store oriented. IUD functionality in a column store is largely unchanged from a row store, however, there are some differences between column store and row store orientations.

With columnar tables, each column of a given row may be stored on a separate page. As a result, when a row is inserted into a table with N columns, N pages are modified (plus any pages required to support uniqueness constraints). This differs from row based tables in which one page (and possibly some pages for index updates) are modified during an insert operation.

Due to compression techniques (to compress data on each page) employed in column stores, rather than updating-in-place, column store updates may be decomposed into a delete of the original copy of the row and an insert of a new copy of the row. Examples herein may refer to insert operations, but embodiments are applicable to insert and update operations.

Also, with column store oriented tables, no Row Identifiers (RIDs) are stored. In certain embodiments, to maximize compression rates, rows in column store tables do not have RIDs stored on disk. Since column store tables store a given row's column values on separate pages, if RIDs were used, each column value would have to be accompanied by a RID, and, by not storing RIDs, embodiments avoid overhead. Instead of using an RID, column values for a given row are stored in the same order in each column. For example, the Nth row in a given table has its column values in the Nth position of each column. The position of a given row in the columnar table is called the Tuple Sequence Number (TSN).

Figure 2:
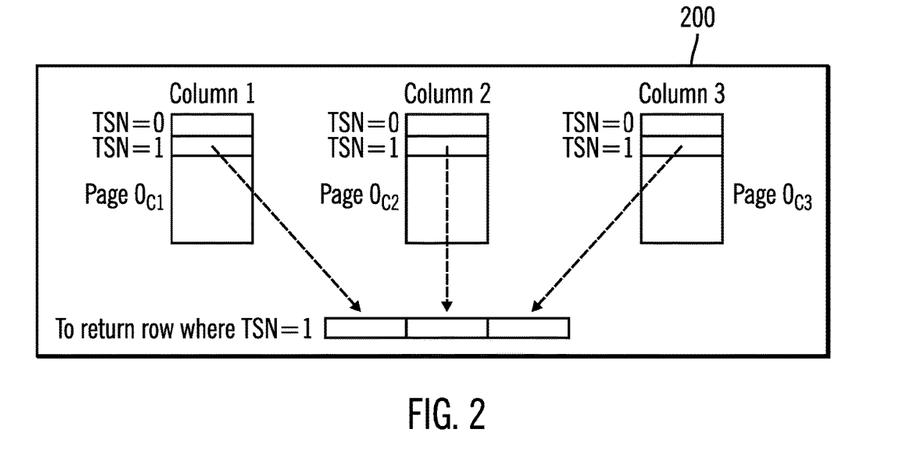
FIG. 2 illustrates a three column table in accordance with certain embodiments.

FIG. 2 illustrates a three column table 200 in accordance with certain embodiments. The column values for TSN1 are in the second position on each of the column pages. As a result, the row may be stitched together (so that the row may be returned in a query result set) by obtaining the column value that appears in the second position of each column.

Columnar tables may allow for better query performance in warehousing environments (where queries usually reference a very small subset of a table's columns).

The TSN value indicates, for a given row, where the row's column values exist in each of the table's columns. Since there is a single TSN value for a given row, each of the row's column values are in the same relative location in the table. For example, the row with TSN=0 has its column values in the first location of each column. This allows for rows to be properly stitched back together so that they can be returned in query result sets. The column values are inserted in the same order in each column. However, without embodiments of this invention, insertion into each column must be serialized, such that only one application may insert rows at one time into the columnar table. Serialization may include locking.

In one example scenario, two rows are being inserted at the same time, and the inserts are not being serialized. For this example scenario, the first row is inserted into column 1 at TSN=0, and the second row is inserted into column 1 at TSN=1. After inserting the first column values, the thread inserting the first row at TSN=0 is swapped out, and the thread performing the insert of the second row at TSN=1 continues. This results in the second row at TSN=1 being inserted before the first row at TSN=0 in column 2. Finally, the column values are inserted in the correct order in column 3. The end result is that when either of these two rows are stitched back together, they will be invalid in that they contain a mix of column values from two distinct rows as there was no serialization.

Embodiments provide an improved technique when there are multiple applications trying to insert into the columnar table at the same time.

In certain embodiments, the PIR system 120 divides up the TSN range (e.g., a 64-bit TSN range) into a set of TSN sub-ranges (e.g., 128 TSN sub-ranges, each consisting of up to $2^{57}$ (about $1.4 \times 10^{17}$) TSNs). Within each TSN sub-range confined to a single transaction, the PIR system 120 serializes inserts. That is, a transaction may have multiple INSERT statements, which are issued sequentially from a single thread. However, multiple TSN sub-ranges may be inserted into the columnar table concurrently. The PIR system 120 may dispatch one thread for each application, and each application transaction updates a TSN sub-range at one time. In certain embodiments, the application may continue to use the same TSN sub-range for multiple transactions. Therefore, one thread may update a TSN sub-range at one time. In certain embodiments, TSN sub-ranges are based on row numbers, and so each TSN sub-range includes all of the columns for a row.

When a transaction issues a first insert, the transaction requests a TSN sub-range from that columnar table's list of sub-ranges and uses that TSN sub-range for subsequent inserts in that transaction. When there are not more than the number of TSN sub-ranges (e.g., 128 TSN sub-ranges) insert/update transactions running concurrently against a given table, there will be an available TSN sub-range for that columnar table. If there are more than the number of TSN sub-ranges (e.g., 128 TSN sub-ranges) insert/update transactions running concurrently against the columnar table, some transactions may have to wait for a TSN sub-range to become available.

At the end of each transaction for the INSERT statement, the application gives up its reservation on the TSN sub-range. In certain embodiments, the PIR system 120 has a queue of waiting applications that wait for a semaphore that is posted when a sub-range becomes available.

In certain alternative embodiments, if there are no other applications waiting for a TSN sub-range, the application may keep its reservation on the TSN sub-range and continue to use that TSN sub-range for inserts in later transactions. This would save the overhead of latching and unlatching the list of reserved TSN sub-ranges at each transaction boundary. However, the overhead of reserving a TSN sub-range may be minor, whereas reserving resources across transaction boundaries may result in a number of operations being blocked or deferred when resources are held or may result in a number of other operations that need special handling for deadlocks when applications holding resources end up queued to wait for a resource.

In certain embodiments, the number of TSN sub-ranges may range from about 16 to 1024, depending on the expected number of applications that will perform insert/update operations in parallel and the number of rows expected to be inserted or updated over the lifetime of the columnar table. In certain embodiments, a smaller number of TSN sub-ranges makes it more likely that insert/update applications running in parallel will need to wait for a TSN sub-range. In certain embodiments, a larger number of TSN sub-ranges make it more likely that a TSN sub-range will run out of TSNs. However, even when the number of TSN sub-ranges is 1024, each TSN sub-range may contain $2^{54}$ TSNs. Thus, even if 1 million TSNs were used up every second, it would take more than 571 years to exhaust the TSNs of a single TSN sub-range. In certain embodiments, the number of TSN sub-ranges is a power of 2 because, then, the PIR system 120 may get the range index from a TSN by taking the upper n bits of the TSN number, where n=log 2(number of TSN sub-ranges).

In certain embodiments, the number of TSN sub-ranges is 128, since 128 is the median of 16 and 1024. In that case, each TSN sub-range contains $2^{57}$ TSNs, and, even if 1 million TSNs were used up every second, it would take more than 4,569 years to exhaust the TSNs of a single TSN sub-range.

Each of the TSN sub-ranges maintains a separate High Water Mark (HWM) value. The HWM indicates how much of a TSN sub-range has been used for insertion. Thus, the HWM governs which rows are visible to other transactions. Each TSN sub-range is reserved by a single insert transaction, and the HWM for that TSN sub-range is updated at commit time of the transaction. As a result, at any given moment, the TSN sub-range HWM indicates the last committed TSN that exists in the TSN sub-range. Since updates are decomposed into a delete followed by an insert, these HWM values help queries determine how far in the columnar table they can read before they have to worry about returning two copies of an updated row.

With embodiments, a CREATE table statement initializes the list of TSN sub-ranges in the table metadata (e.g., to contain 128 TSN sub-ranges, each of size $2^{57}$ TSNs and each with a HWM set to UNSPECIFIED_TSN).

With embodiments, for a LOAD table statement, the RDBMS 110 loader locks the columnar table so that no application can read or update the columnar table. In some embodiments, ALLOW READ ACCESS may be specified, which allows applications to read the non-delta part of the columnar table while the columnar table is being loaded. In either case, no application can update the columnar table while the columnar is being loaded. A LOAD REPLACE table statement replaces the contents of the columnar table with the rows loaded in. A LOAD INSERT table statement appends the loaded rows to those already in the columnar table. Since the load operation has exclusive access to the columnar table (i.e., no other applications may update the columnar table while the load is running), the load operation may use any of the TSN sub-ranges (one at a time) and need not divide up the inserts across multiple TSN sub-ranges (the way that inserts across multiple transactions do). This exploits concurrency within a single TSN sub-range.

In alternative embodiments, the LOAD table statement reserves one or more TSN sub-ranges and loads data into the reserved one or more TSN sub-ranges.

With embodiments, queries, for each TSN sub-range, cache the high water mark (HWM). This is available through the list of TSN sub-ranges that is in a data structure that represents the columnar table.

With embodiments, when a transaction issues a first insert or update operation, the transaction requests a TSN sub-range from that table's list of TSN sub-ranges and uses that for all subsequent insert or update operations. In certain embodiments, when there are not more than 128 insert/update transactions running concurrently against a given table, there will be an available TSN sub-range for that columnar table; and, if there are more than 128 insert/update transactions running concurrently against the columnar table, some transactions will have to wait for a TSN sub-range to become available.

In certain embodiments, to reserve a TSN sub-range, a data structure that represents an application maintains a map that maps columnar tables (that the application inserts into or updates) to TSN sub-ranges. This data structure specifies for each columnar table whether an application has reserved a TSN sub-range for that columnar table (or is waiting for one). Before each insert into a columnar table, the PIR system 120 checks this map to determine whether the application already has a TSN sub-range reserved for that columnar table.

In certain embodiments, it is not necessary to latch this map because when one application is running multiple threads, the PIR system 120 uses a latch to ensure that only one database (e.g., SQL) statement executes at a time. Therefore, even if multiple threads in the same application are running multiple inserts against the same columnar table at the same time, the multiple threads running on behalf of the application will not check or update the map at the same time. Not having a latch means that once an application has a TSN sub-range reserved, the checking of the map at each INSERT statement may be done efficiently. If the application does not already have a TSN sub-range reserved, the PIR system 120 will reserve one.

In certain embodiments, when reserving a TSN sub-range, the PIR system 120 obtains a latch before checking the list of reserved TSN sub-ranges and releases the latch after reserving a TSN sub-range (or finding none is available). In certain embodiments, because there are 128 TSN sub-ranges, the list of reserved TSN rub-ranges is kept as a bit vector in two unsigned 64-bit words and, thus, accessed and updated quickly. If there are no TSN sub-ranges available, the PIR system 120 adds the application to a queue of applications waiting for a TSN sub-range. Because multiple applications may be trying to get on the queue at the same time, the queue may be latched during the push operation (which may occur when more than 128 applications are trying to insert into the same columnar table at the same time).

With embodiments, when releasing a TSN sub-range, at the end of each transaction where the application has a TSN sub-range reserved, the PIR system 120 checks whether other applications are waiting for a TSN sub-range (that is, the queue referred to above is not empty). If other applications are waiting for a TSN sub-range, then the application gives its TSN sub-range to the application at the head of the queue. Note that during this process, the TSN sub-range stays reserved, and, therefore, it is not necessary to latch or update the bit vector of reserved TSN sub-ranges. If no other applications are waiting, the application gives up its TSN sub-range, and the TSN sub-range becomes available for any later application that requests a TSN sub-range.

Embodiments use various data structures (or classes in an object-oriented language) in the implementation of parallel TSN sub-ranges.

An instance of an Application class represents an application that accesses a columnar table. The primary data member of the Application class may include:

A hash (for example, std::map) that maps columnar tables to reserved TSN sub-ranges. A entry of myTable→myRange means the application has reserved myRange (a TSN sub-range) for myTable (a columnar table). An entry of myTable→NULL means the application is waiting for a TSN sub-range for myTable.

An instance of an InsertRange class is a TSN sub-range and related information that an insert or update transaction has reserved for inserting into a columnar table. The primary data members of the InsertRange class may include:

The TSN sub-range identifier (ID) or number.

The start TSN, high water mark TSN, and last used TSN.

A pointer to the Application object (if any) that has the TSN sub-range reserved.

An instance of the InsertRangeList class is a list of TSN sub-ranges (class InsertRange). It is associated with a particular columnar table object so that all transactions that insert/update the columnar table have access to it. The primary data members of the InsertRangeList class may include:

A 128-element array containing the TSN sub-ranges (class InsertRange).

Two unsigned 64-bit words whose bits indicate which TSN sub-range is reserved, along with an associated latch to ensure thread-safe access and updates.

A queue of applications waiting for a TSN sub-range, along with an associated latch to ensure thread-safe access and updates.

An instance of the InsertRangeListIterator class is an iterator over a list of TSN sub-ranges (class InsertRangeList). The primary data members of the InsertRangeListIterator class may include:

A pointer to a TSN sub-range in class InsertRangeList.

A pointer past the last TSN sub-range in class InsertRangeList (so that the PIR system 120 knows when the iterator is at the end).

An instance of the Table class is a columnar table. The primary data members of the Table class may include many data members, such as:

A TSN sub-range list (class InsertRangeList), which indicates which TSN sub-ranges are reserved by an application.

Figure 3A:
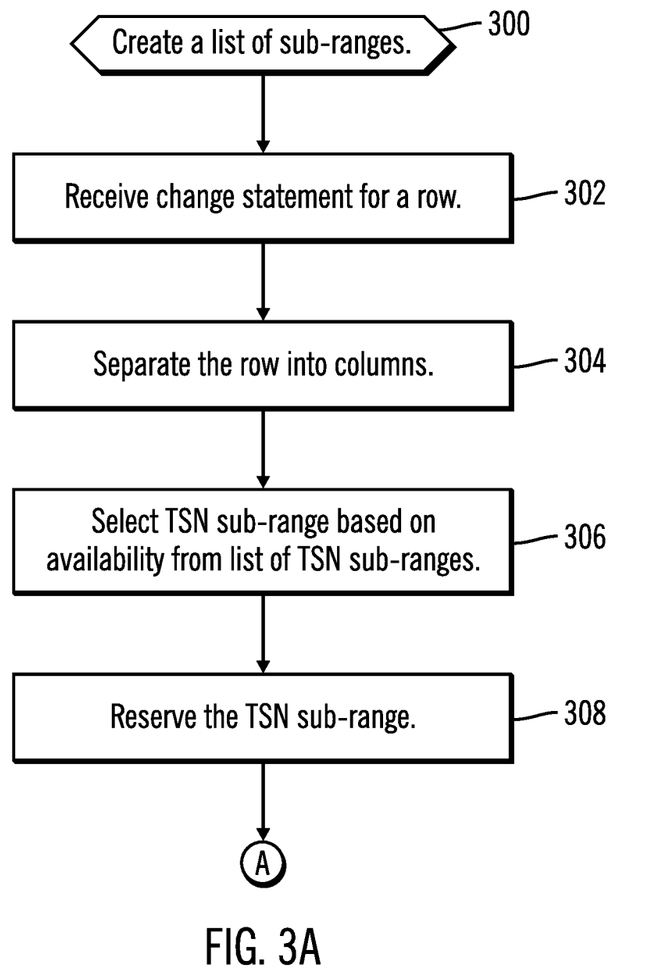
FIG. 3A and FIG. 3B illustrate, in a flow diagram, operations for changing data in a columnar table in accordance with certain embodiments.
Figure 3B:
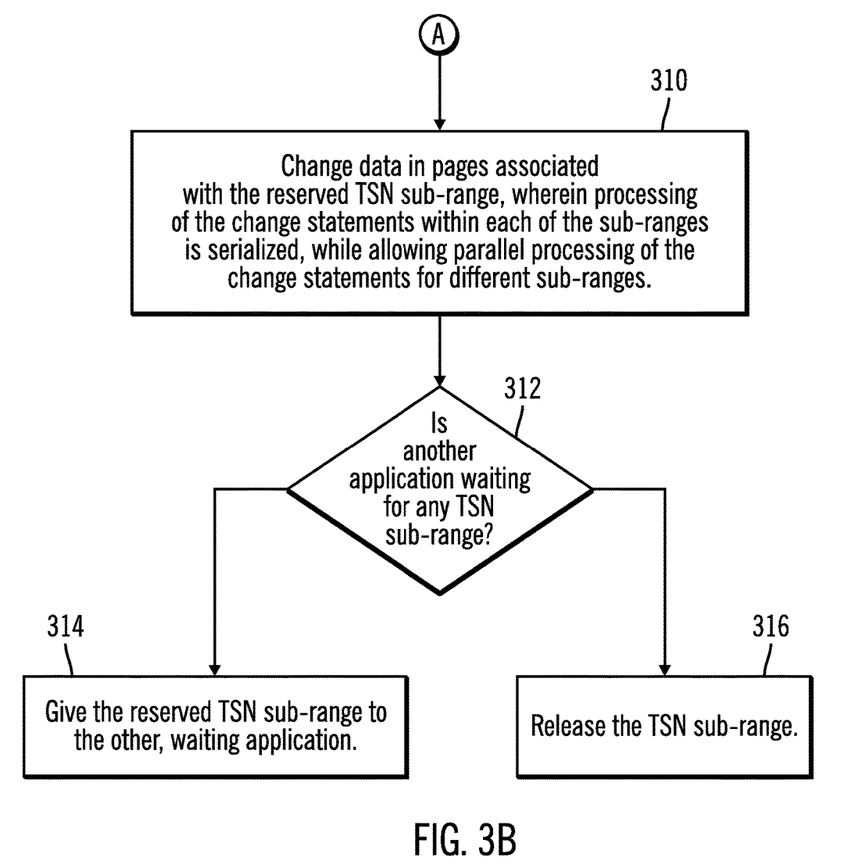

FIG. 3A and FIG. 3B illustrate, in a flow diagram, operations for changing data in a columnar table in accordance with certain embodiments. Control begins at block 300 with the PIR system 120 creating a set of sub-ranges. In block 302, the PIR system 120 receives a change statement (e.g., an Insert or Update statement in SQL) for a row. In block 304, the PIR system 120 separates the row into columns. In block 306, the PIR system 120 selects a TSN sub-range based on availability from the list of TSN sub-ranges. In certain embodiments, the first TSN sub-range on the list of TSN sub-ranges that is not being used by another application is selected. In block 308, the PIR system 120 reserves the TSN sub-range. From block 308 (FIG. 3A), processing continues to block 310 (FIG. 3B).

In block 310, the PIR system 120 changes data in pages associated with the reserved TSN sub-range. In block 312, the PIR system 120 determines whether another application is waiting for the reserved TSN sub-range. If so, processing continues to block 314, otherwise, processing continues to block 316. In block 314, the PIR system 120 gives the reserved TSN sub-range to the other, waiting application. In block 316, the PIR system 120 releases the TSN sub-range.

Thus, embodiments provide a technique for using parallel insert sub-ranges to change a column store (oriented) database in which, responsive to receiving a change to a column store table, locking (serializing) a sub-range of rows to update the sub-range of rows. In certain embodiments, the change is selected from a group consisting of an insert operation and an update operation. In certain embodiments, responsive to completing the change to the sub-range of rows, releasing the sub-range of rows. In certain embodiments, the range of rows to lock (serialize) are in power of two (for example $2^{64}$ row numbers into a set of 128 TSN sub-ranges each in with $2^{57}$ rows). Embodiments maintain a pool of sub-ranges of rows to receive and release the sub-ranges of rows. Responsive to detecting an absence of availability of a sub-range, waiting for an availability of a required sub-range to change.

In certain embodiments, changes are stored into a column oriented table, while in other embodiments, changes are stored into a row oriented table.

The following example is provided merely to enhance understanding of embodiments. For example, there are two sub-ranges:

TSN sub-range 1=TSN0-TSN 99
TSN sub-range 2=TSN100-TSN 199

The PIR system 120 receives an insert statement to insert data into a row. One of the TSN sub-ranges is selected, and data is inserted into that sub-range.

In certain embodiments, the PIR system 120 selects a TSN sub-range based on availability, and the row number (or TSN number) ends up being the first free TSN in that TSN sub-range. In certain alternative embodiments, a particular new row 5 may be inserted, and the PIR system 120 selects the TSN sub-range 1.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
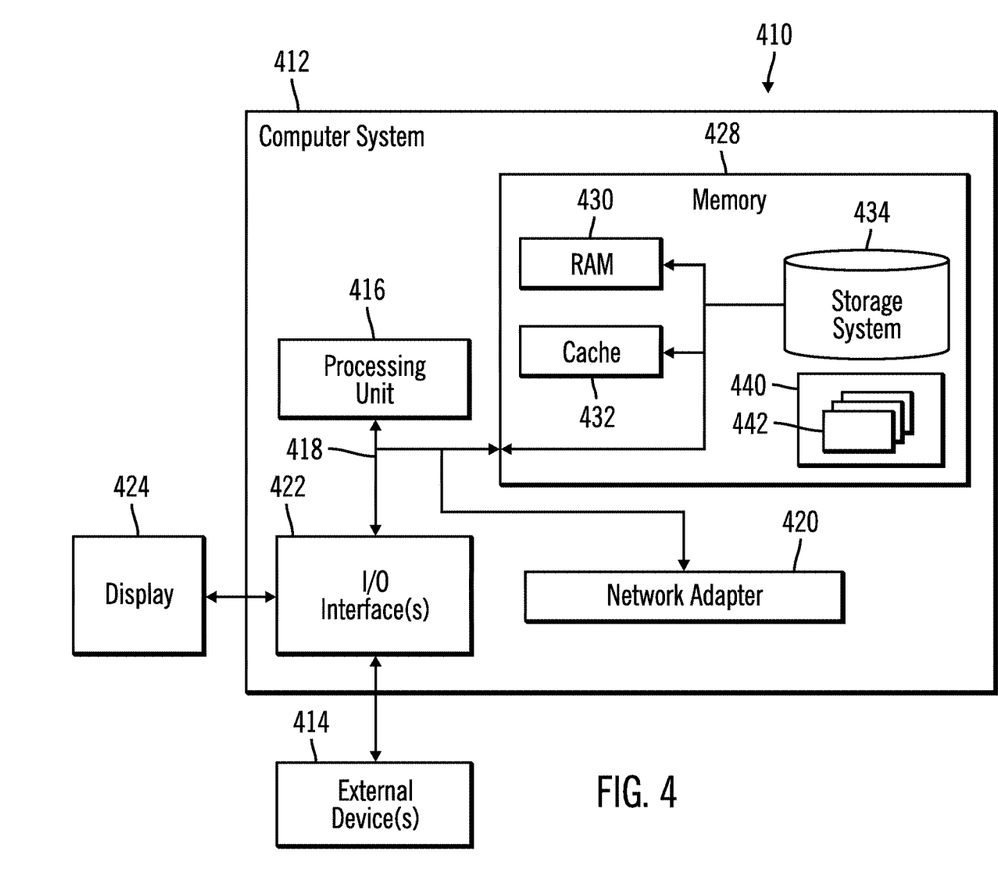
FIG. 4 depicts a cloud computing node in accordance with certain embodiments.

Referring now to FIG. 4, a schematic of an example of a cloud computing node is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
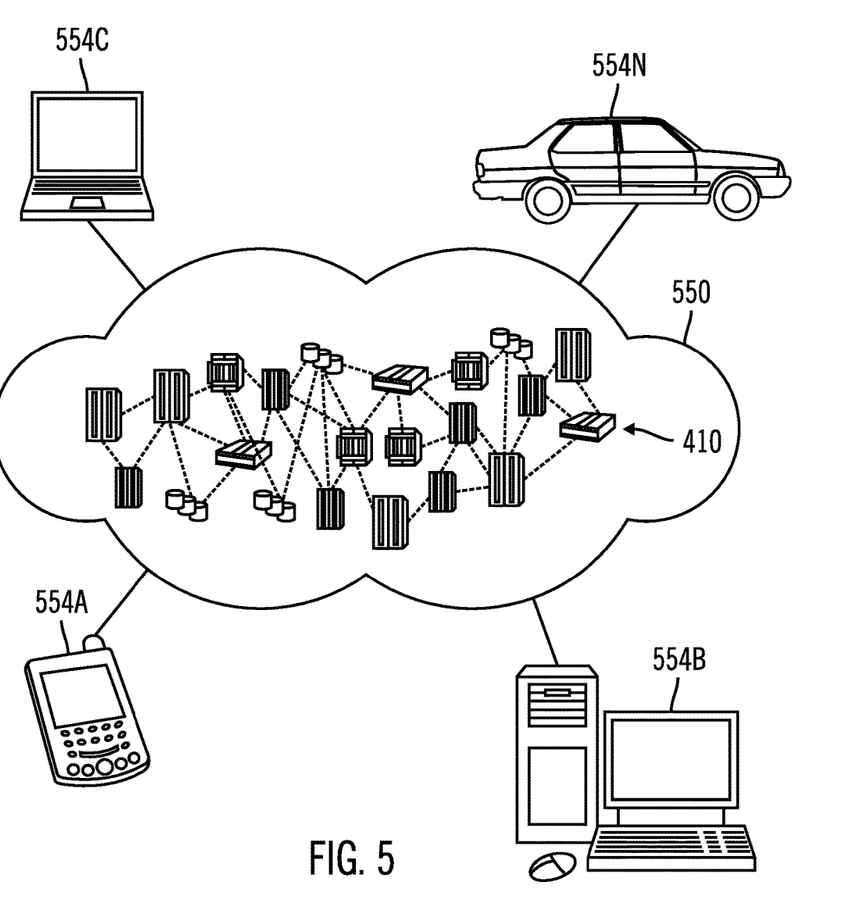
FIG. 5 depicts a cloud computing environment in accordance with certain embodiments.

Referring now to FIG. 5, illustrative cloud computing environment 550 is depicted. As shown, cloud computing environment 550 comprises one or more cloud computing nodes 410 with which local computing devices used by cloud consumers, such as, for example, personal digital assistant (PDA) or cellular telephone 554A, desktop computer 554B, laptop computer 554C, and/or automobile computer system 554N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 410 and cloud computing environment 550 can communicate with any type of computerized device over any type of network and/or network addressable connection (e.g., using a web browser).

Figure 6:
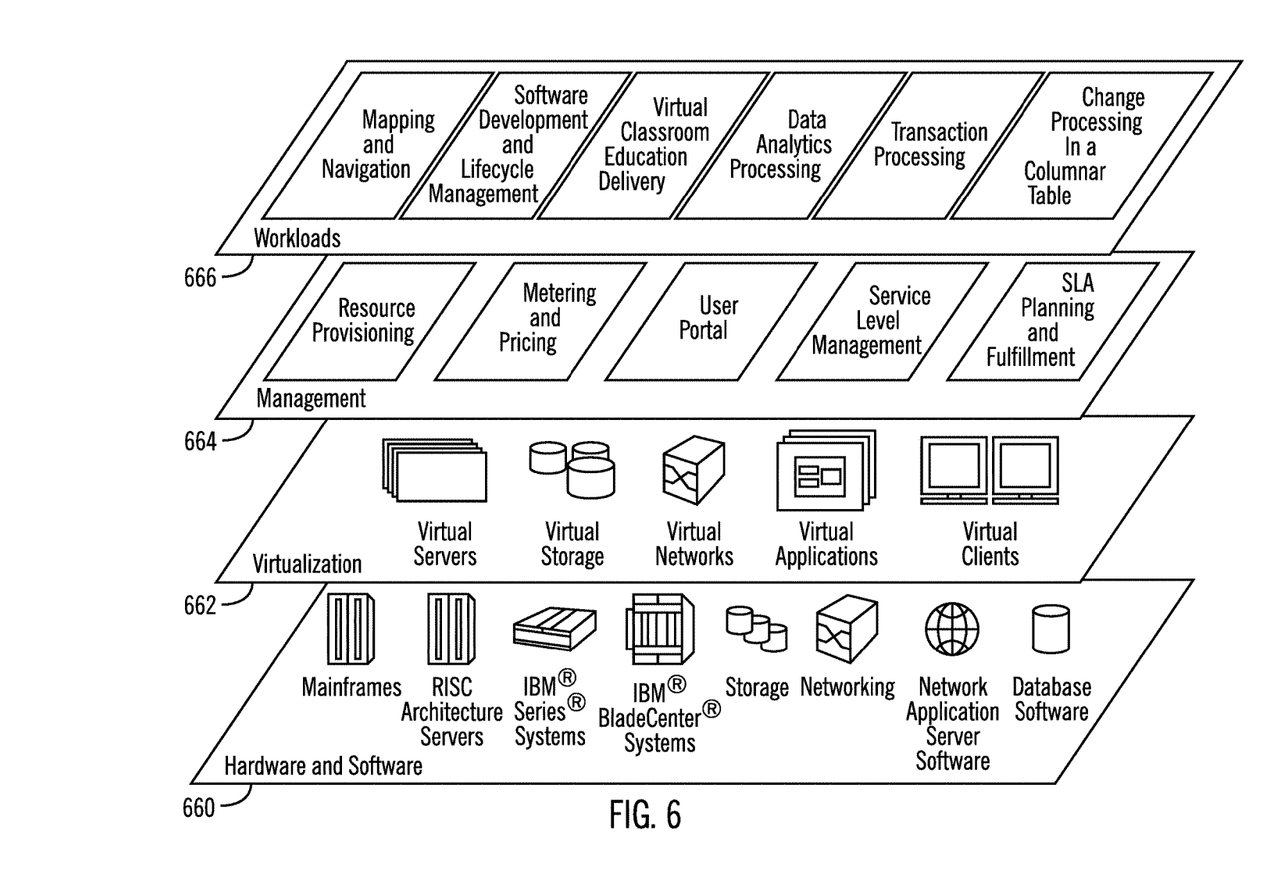
FIG. 6 depicts abstraction model layers in accordance with certain embodiments.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and change processing in a columnar table.

Thus, in certain embodiments, software or a program, implementing change processing in a columnar table in accordance with embodiments described herein, is provided as a service in a cloud environment.

In certain embodiments, the computing device 100 has the architecture of computing node 410. In certain embodiments, the computing device 100 is part of a cloud environment. In certain alternative embodiments, the computing device 100 is not part of a cloud environment.

ADDITIONAL EMBODIMENT DETAILS

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:
1. A method, comprising:
creating a list of sub-ranges for a columnar table;
receiving a change statement for a row to be inserted into the columnar table;
reserving a sub-range that is available from the list of sub-ranges;
serially inserting data into the reserved sub-range of the columnar table, while allowing parallel processing of any change statement for different sub-ranges from the list of sub-ranges of the columnar table;
determining whether an application is waiting for any sub-range from the list of sub-ranges;
in response to determining that the application is waiting for any sub-range from the list of sub-ranges, giving the reserved sub-range to the application; and
in response to determining that the application is not waiting for any sub-range from the list of sub-ranges, releasing the reserved sub-range.

2. The method of claim 1, wherein the change statement is selected from a group consisting of an insert statement and an update statement.

3. The method of claim 1, wherein the sub-ranges from the list of sub-ranges are sub-ranges of rows created based on Tuple Sequence Numbers associated with rows of the columnar table.

4. The method of claim 1, further comprising:
waiting for a sub-range from the list of sub-ranges to become available.

5. The method of claim 1, wherein each of the sub-ranges from the list of sub-ranges has an associated high water mark, and wherein the associated high water mark governs which rows are visible to other transactions.

6. The method of claim 1, wherein a Software as a Service (SaaS) is configured to perform method operations.

7. A computer system for using parallel inserts to change a columnar table, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform:
creating a list of sub-ranges for a columnar table;
receiving a change statement for a row to be inserted into the columnar table;
reserving a sub-range that is available from the list of sub-ranges;
serially inserting data into the reserved sub-range of the columnar table, while allowing parallel processing of any change statement for different sub-ranges from the list of sub-ranges of the columnar table;
determining whether an application is waiting for any sub-range from the list of sub-ranges;
in response to determining that the application is waiting for any sub-range from the list of sub-ranges, giving the reserved sub-range to the application; and
in response to determining that the application is not waiting for any sub-range from the list of sub-ranges, releasing the reserved sub-range.

8. The computer system of claim 7, wherein the change statement is selected from a group consisting of an insert statement and an update statement.

9. The computer system of claim 7, wherein the sub-ranges from the list of sub-ranges are sub-ranges of rows created based on Tuple Sequence Numbers associated with rows of the columnar table.

10. The computer system of claim 7, wherein the program instructions perform:
waiting for a sub-range from the list of sub-ranges to become available.

11. The computer system of claim 7, wherein each of the sub-ranges from the list of sub-ranges has an associated high water mark, and wherein the associated high water mark governs which rows are visible to other transactions.

12. The computer system of claim 7, wherein a Software as a Service (SaaS) is configured to perform computer system operations.

13. A computer program product for using parallel inserts to change a columnar table, the computer program product comprising a computer readable storage medium having program instructions embodied therewith, the program instructions executable by a processor of a computer to cause the processor to:
create, by the processor, a list of sub-ranges for a columnar table;
receive, by the processor, a change statement for a row to be inserted into the columnar table;
reserve, by the processor, a sub-range that is available from the list of sub-ranges;
serially insert, by the processor, data into the reserved sub-range of the columnar table, while allowing parallel processing of any change statement for different sub-ranges from the list of sub-ranges of the columnar table;
determine, by the processor, whether an application is waiting for any sub-range from the list of sub-ranges;
in response to determining that the application is waiting for any sub-range from the list of sub-ranges, give, by the processor, the reserved sub-range to the application; and
in response to determining that the application is not waiting for any sub-range from the list of sub-ranges, release, by the processor, the reserved sub-range.

14. The computer program product of claim 13, wherein the change statement is selected from a group consisting of an insert statement and an update statement.

15. The computer program product of claim 13, wherein the sub-ranges from the list of sub-ranges are sub-ranges of rows created based on Tuple Sequence Numbers associated with rows of the columnar table.

16. The computer program product of claim 13, wherein the program instructions are executable by the processor of the computer to cause the processor to:
wait, by the processor, for a sub-range to become available.

17. The computer program product of claim 13, wherein a Software as a Service (SaaS) is configured to perform computer program product operations.

18. The computer program product of claim 13, wherein each of the sub-ranges from the list of sub-ranges has an associated high water mark, and wherein the associated high water mark governs which rows are visible to other transactions.

* * * * *